(12) United States Patent
Granovsky et al.

(10) Patent No.: US 12,423,235 B2
(45) Date of Patent: Sep. 23, 2025

(54) COHERENCE DIRECTORY WAY TRACKING IN COHERENT AGENTS

(71) Applicant: Apple Inc., Cupertino, CA (US)

(72) Inventors: Ilya Granovsky, Kiryat Tivon (IL); Amanvir Singh Sidana, San Jose, CA (US); Sandeep Gupta, Santa Clara, CA (US); Tom Greenshtein, Haifa (IL); Vivek Venkatraman, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 59 days.

(21) Appl. No.: 18/433,118

(22) Filed: Feb. 5, 2024

(65) Prior Publication Data

US 2025/0103496 A1    Mar. 27, 2025

Related U.S. Application Data

(60) Provisional application No. 63/585,263, filed on Sep. 26, 2023.

(51) Int. Cl.
*G06F 12/0817* (2016.01)
*G06F 12/0891* (2016.01)

(52) U.S. Cl.
CPC ...... *G06F 12/0817* (2013.01); *G06F 12/0891* (2013.01)

(58) Field of Classification Search
None
See application file for complete search history.

(56) References Cited

U.S. PATENT DOCUMENTS

| | | | |
|---|---|---|---|
| 10,282,295 B1 | 5/2019 | Walker et al. | |
| 11,615,026 B2 | 3/2023 | Hagersten et al. | |
| 2005/0198441 A1* | 9/2005 | Tokoro | G06F 12/0817 711/141 |
| 2019/0236011 A1 | 8/2019 | Dropps et al. | |
| 2022/0100661 A1 | 3/2022 | Apte et al. | |

* cited by examiner

*Primary Examiner* — Charles J Choi
(74) *Attorney, Agent, or Firm* — Kowert, Hood, Munyon, Rankin & Goetzel, P.C.; Scott W. Pape; Dean M. Munyon

(57) ABSTRACT

An apparatus includes a plurality of coherent agents, and a coherence directory that includes directory ways for storing coherency information. The coherence directory may be configured to determine that a cache block that is not currently cached among the coherent agents, is stored in a first coherent agent. The coherence directory may be further configured to, in response to this determination, create a particular entry in a selected one of the directory ways. The coherence directory may also be configured to send, to the first coherent agent, an indicator identifying a directory way that includes the entry. In response to a second coherent agent caching the cache block, the coherence directory may update the entry to include the second coherent agent. The first and second coherent agents may be configured to receive copies of the indicator, and to store their copy in locations associated with the cache block.

20 Claims, 12 Drawing Sheets

SOC 101

SOC 101

*600*

```
┌─────────────────────────────────────────────────────────────┐
│ Storing, by a single one of a plurality of coherent agent   │
│ circuits, a particular cache block in a respective cache    │
│ circuit.                                                    │
│ 610                                                         │
└─────────────────────────────────────────────────────────────┘
                              │
                              ▼
┌─────────────────────────────────────────────────────────────┐
│ Sending, by the single coherent agent circuit to a coherence│
│ directory circuit, a fill notice including an indication of │
│ the particular cache block.                                 │
│ 620                                                         │
└─────────────────────────────────────────────────────────────┘
                              │
                              ▼
┌─────────────────────────────────────────────────────────────┐
│ Creating, by the coherence directory circuit, a particular  │
│ entry in a selected directory way of a plurality of         │
│ directory ways.                                             │
│ 630                                                         │
└─────────────────────────────────────────────────────────────┘
                              │
                              ▼
┌─────────────────────────────────────────────────────────────┐
│ Sending, by the coherence directory circuit to the single   │
│ coherent agent, an indicator identifying a subset of the    │
│ plurality of directory ways that includes the particular    │
│ entry.                                                      │
│ 640                                                         │
└─────────────────────────────────────────────────────────────┘
                              │
                              ▼
┌─────────────────────────────────────────────────────────────┐
│ Storing, by the single coherent agent circuit, the indicator│
│ in a location associated with the particular cache block.   │
│ 650                                                         │
└─────────────────────────────────────────────────────────────┘
```

```
┌─────────────────────────────────────────────────────────────┐
│ Storing, by a different one of the plurality of coherent    │
│ agent circuits, the particular cache block in a different   │
│ cache circuit.                                              │
│                            810                              │
└─────────────────────────────────────────────────────────────┘
                              │
                              ▼
┌─────────────────────────────────────────────────────────────┐
│ Sending, by the different coherent agent circuit to the     │
│ coherence directory circuit, a fill notice including an     │
│ indication of the particular cache block.                   │
│                            820                              │
└─────────────────────────────────────────────────────────────┘
                              │
                              ▼
┌─────────────────────────────────────────────────────────────┐
│ Updating, by the coherence directory circuit, the particular│
│ entry to include the different coherent agent.              │
│                            830                              │
└─────────────────────────────────────────────────────────────┘
                              │
                              ▼
┌─────────────────────────────────────────────────────────────┐
│ Sending, by the coherence directory circuit, the indicator  │
│ to the different coherent agent.                            │
│                            840                              │
└─────────────────────────────────────────────────────────────┘
                              │
                              ▼
┌─────────────────────────────────────────────────────────────┐
│ Storing, by the different coherent agent circuit, the       │
│ indicator in a respective location associated with the      │
│ particular cache block.                                     │
│                            850                              │
└─────────────────────────────────────────────────────────────┘
```

```
┌─────────────────────────────────────────────────────────┐
│ Storing, by a coherent agent circuit that has received  │
│ a directory marker disable signal, a cache block in a   │
│ different cache circuit.                                │
│ 910                                                     │
└─────────────────────────────────────────────────────────┘
                            │
                            ▼
┌─────────────────────────────────────────────────────────┐
│ In response to determining that an entry associated     │
│ with the cache block does not currently exist, creating,│
│ by the coherence directory circuit, an entry in one of  │
│ the plurality of directory ways.                        │
│ 920                                                     │
└─────────────────────────────────────────────────────────┘
                            │
                            ▼
┌─────────────────────────────────────────────────────────┐
│ Sending, by the coherence directory circuit to the      │
│ coherent agent, an indicator for the directory way.     │
│ 930                                                     │
└─────────────────────────────────────────────────────────┘
                            │
                            ▼
┌─────────────────────────────────────────────────────────┐
│ Ignoring, by the coherent agent circuit, the indicator. │
│ 940                                                     │
└─────────────────────────────────────────────────────────┘
                            │
                            ▼
┌─────────────────────────────────────────────────────────┐
│ In response to evicting the cache block, sending, by    │
│ the coherent agent to the coherence directory circuit,  │
│ an indication of the evicting without the indicator.    │
│ 950                                                     │
└─────────────────────────────────────────────────────────┘
                            │
                            ▼
┌─────────────────────────────────────────────────────────┐
│ In response to the indication of the evicting without   │
│ the indicator, searching, by the coherence directory    │
│ circuit, for the entry in the plurality of directory    │
│ ways.                                                   │
│ 960                                                     │
└─────────────────────────────────────────────────────────┘
```

FIG. 9

COHERENCE DIRECTORY WAY TRACKING IN COHERENT AGENTS

The present application claims priority to U.S. Provisional App. No. 63/585,263, entitled "Coherence Directory Way Tracking in Coherent Agents," filed Sep. 26, 2023, the disclosure of which is incorporated by reference herein in its entirety.

BACKGROUND

Technical Field

Embodiments described herein are related to computer systems, including systems-on-a-chip (SOCs) and multi-die packages. More particularly, the disclosed embodiments are directed towards methods for operating a cache memory.

Description of the Related Art

Computer systems, such as systems-on-chip (SOCs), generally include one or more processors that serve as central processing units (CPUs) for a system, along with various other components such as memory controllers and peripheral components. Cache memories are frequently used in SOCs to support increased performance of processors by reducing delays associated with memory fetches to system memories and/or non-volatile storage memories. Cache memories may store local copies of information stored in frequently accessed memory addresses. These local copies may have shorter delays for providing stored values to processors than performing a memory access to a target memory address. In a computer system with multiple cache memories, coherency is maintained between a plurality of local copies of a same memory location.

In a typical system, a cache memory may perform coherence maintenance by maintaining duplicate tags for various cache memories coupled to respective processor core complexes. As used herein, a "processor core complex" or simply "core complex" may be a set of one or more processor cores with a common cache memory, common memory controller, and other shared supporting logic. A cache memory coupled to a core complex may be referred to as a "last-level cache" or "LLC" for short. If a number of core complexes is small, then tracking duplicate tags for the respective LLCs may be sufficient. As a number of core clusters in a system increases, effort for tracking duplicate tags for the respective LLCs may increase.

BRIEF DESCRIPTION OF THE DRAWINGS

The following detailed description makes reference to the accompanying drawings, which are now briefly described.

FIG. 6 illustrates a flow diagram of an embodiment of a method for storing a directory way indicator in a coherent agent storing a particular cache block.

FIG. 8 depicts a flow diagram of an embodiment of a method for storing a directory way indicator in a coherent agent storing an existing cache block.

FIG. 9 illustrates a flow diagram of an embodiment of a method for disabling directory way indicators in a coherent agent.

Figure 1:
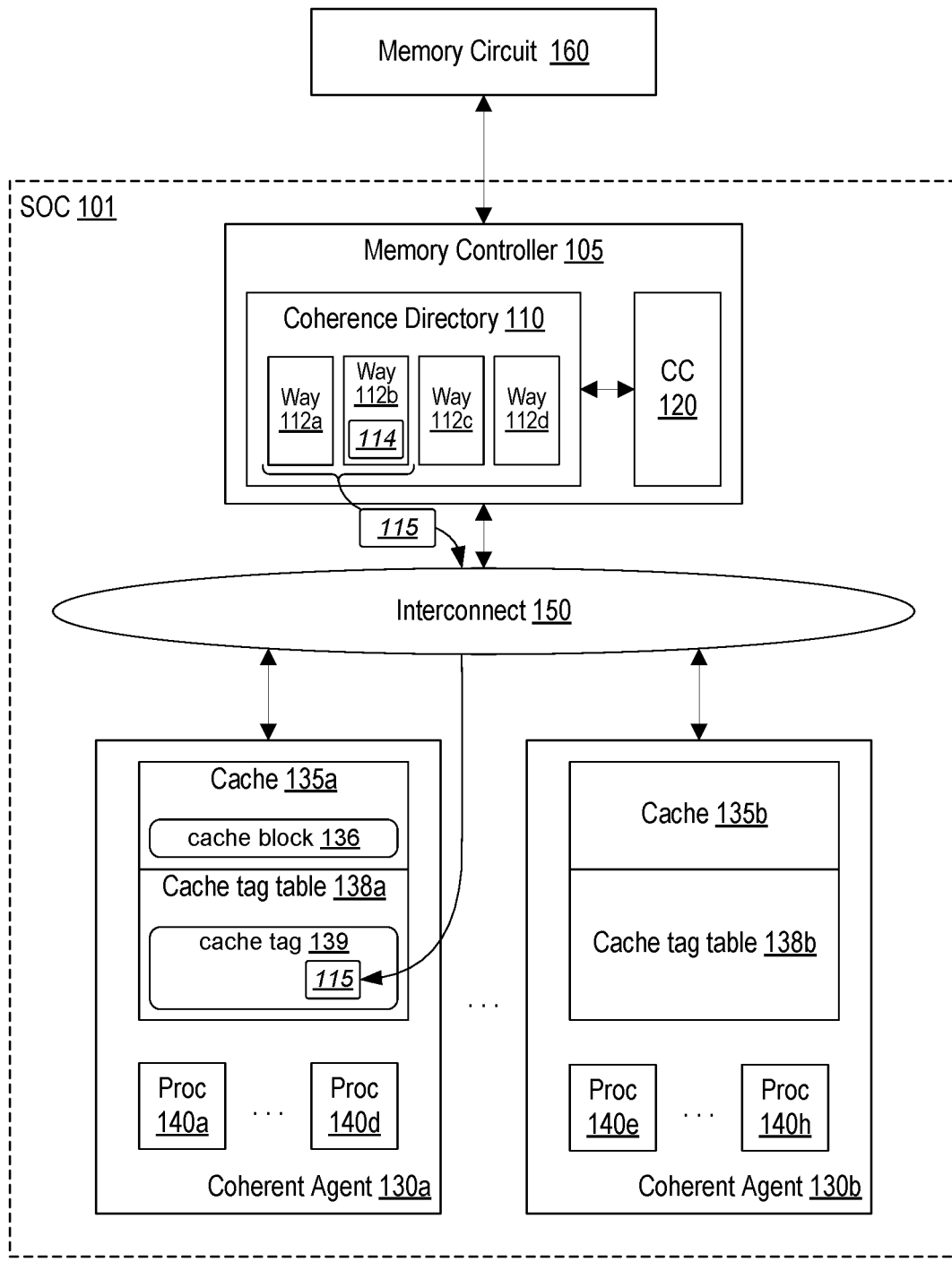
FIG. 1 illustrates a block diagram of an embodiment of a system that includes a coherence directory circuit and a plurality of coherent agents.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

As described, an increase in a number of core clusters in a system may result in an increased effort for tracking duplicate tags for the respective LLCs. To address this increased effort and improve scalability of the systems, some systems may employ a directory-based coherence management scheme. A coherence directory may track each cache block that is cached in one or more LLCs (or other caching agents, if there are any) in a respective directory entry. Such a directory may be set associative, but such associativity may be unrelated to the associativity of the LLC(s) that are caching the block since different core clusters may cache a same given cache block in different ways of the LLCs. When a cache block is evicted from a given LLC, all directory entries in the coherence directory may have to be read to compare tags and identify the correct directory entry to update to reflect the eviction, thereby consuming power in an inefficient manner.

The disclosed embodiments address systems and methods for reducing power consumption and time for identifying coherence directory entries in response to a cache block eviction. When a given cache block, corresponding to a particular memory location, is cached in an LLC of a core cluster, the LLC includes an identifier of a coherence directory way for the directory entry corresponding to the cache block. As long as the given cache block remains cached in at least one LLC, the directory entry cannot be reallocated to a different cache block, so the directory way remains valid. If a second LLC caches the same memory location, When the LLC evicts the given cache block, the LLC returns the directory way supplied with the cache block, to the coherence directory. The coherence directory may then read just the indicated way to identify the directory entry to be updated.

FIG. 1 illustrates a block diagram of an embodiment of a system including a system-on-chip (SOC) and a memory circuit. As illustrated, system 100 includes SOC 101 coupled to memory circuit 160. SOC 101 includes memory controller 105 coupled to coherence agents 130a and 130b (collectively 130) via interconnect 150. System 100 may be, in whole or in part, a computing system, such as a desktop or laptop computer, a smartphone, a tablet computer, a wearable smart device, or the like. In some embodiments, system 100 is a single IC, such as a system-on-chip, or a multi-die chip.

Memory circuit 160, as shown, may be implemented as any suitable type of memory circuits including volatile, non-volatile memory, and combinations thereof. Memory circuit 160 may include one or more memory management controllers and may include memory circuits, such as, static random-access memory (SRAM), as well as dynamic random-access memory (DRAM) and/or non-volatile memories such as flash memory. In some embodiments, memory circuit 160 may include interfaces for accessing separate DRAM and/or flash memory devices. As an example, memory circuit 160 may include SRAM, a first memory controller circuit for accessing DRAM, and a second memory controller for accessing flash memory. Program instructions and various types of data files may be stored in the flash data for long-term storage, such as when system 100 is powered-down. During a boot process, an operating system and one or more applications may be launched, including copying at least some of the instructions and related information into DRAM and/or SRAM for faster access by SOC 101.

As illustrated, SOC 101 includes coherent agents 130, each coherence agent including a respective plurality of processor cores (proc) 140a-140h (collectively 140). In some embodiments, each of coherent agents 130 may be a core complex with a respective set of processor cores (processor cores 140a-140d in coherence agent 130a and processor cores 140e-140h in coherence agent 130b). Processor cores 140 may be configured to initiate a memory access as part of a memory transaction and receiving a response to the memory access. Processor cores 140 are configured to generate read and write requests for addresses in memory circuit 160. Information read from memory circuit 160 may be cached in a respective cache block of cache circuits 135a and/or 135b (collectively 135) included in coherence agents 130a and 130b, respectively. Processor cores 140 may be configured to implement any suitable instruction set architecture (ISA), such as, e.g., ARM™, PowerPC®, Blackfin®, or x86 ISAs, or combination thereof. In some embodiments, one or more of processor cores 140 may be a specialized core such as a floating-point processor, a digital-signal processor, graphics processor, neural-network engine, or the like.

Memory controller 105, as shown, may be configured to issue memory transactions for reading and writing information from/to memory circuit 160. Such memory transactions may be initiated by one of processor cores 140a-140h in a respective one of coherent agents 130. Memory controller 105 includes coherency circuit (CC) 120 that is configured to monitor various cache circuits, including cache circuits 135, and detect copies of a same cache block being stored in more than one cache circuit. If a value in one of the copies is modified, then coherency circuit 120 sends an indication to the other cache circuits with other copies of the same cache block. The other cache circuits may update cache tags corresponding to their local copy of the cache block and may further issue memory transactions to retrieve the modified value to update their local copy.

As used herein, a "cache block" refers to a group of values corresponding to a given range of memory locations that are copied and stored into a cache circuit. A size of a cache block may vary between different systems and between different cache circuits within a common system. In various embodiments, a cache block may correspond to a single cache line in a cache circuit, a plurality of cache lines in a cache circuit, or a partial cache line in a cache circuit. In some embodiments, a given cache circuit may be configurable to support different sizes of cache blocks, including concurrently. For example, a particular cache circuit may be configurable to store a first cache block as one-half of a cache line, and second cache block as a full cache line, and a third cache block that is stored in four cache lines. These different cache blocks may be supported by the particular cache circuit simultaneously. The different cache blocks may each have a respective cache tag associated with the entirety of the respective cache block, regardless of size. If two different cache circuits are stated as caching the same cache block, then the two cache circuits are storing respective copies of the same values currently stored in a same range of memory locations, e.g., within memory circuit 160.

To track which cache circuits currently have a particular cache block, coherency circuit 120 uses coherence directory circuit 110, which includes a plurality of directory ways 112a-112d (collectively 112) for storing coherency information associated with coherent agents 130. Coherence directory circuit 110 may be configured to determine that a particular cache block (e.g., cache block 136), that is not currently cached among coherent agents 130, is initially stored in coherent agent 130a. For example, coherent agent 130a may issue a memory transaction, with a particular address, to access a range of values stored in memory circuit 160 starting at the particular address. Cache circuit 135a may be accessed first to determine if a local copy of the values starting at the particular address are already cached. After determining that a local copy is not currently cached, cache circuit 135a may issue a cache fill request corresponding to the memory transaction. Memory controller 105 may receive the cache fill request for the memory transaction and access memory circuit 160 to retrieve the requested values from the particular address. A cache fill response is generated, including the requested values, and sent, via memory controller 105 to cache circuit 135a. After receiving the values in the cache fill response, cache circuit 135a may store the values as cache block 136 and create a corresponding cache tag 139 in cache tag table 138a. Cache tag 139 may include a portion of, or a hash of, the particular address, as well as a plurality of status bits.

In response to the determination that coherent agent 130a is storing a copy of cache block 136 that is not currently stored in coherent agent 130b, coherence directory circuit 110 may create entry 114 in directory way 112b of the plurality of directory ways 112. Entry 114, for example, may include an indication that coherent agent 130a (indicated by the "a" in entry 114 depicted at the bottom of FIG. 1) has a copy of cache block 136. Entry 114 may also include a portion of, or a hash of, the particular address to identify that entry 114 is currently associated with cache block 136.

As illustrated, coherence directory circuit 110 may be further configured to send, to coherent agent 130a, indicator 115 identifying a subset of directory ways 112 that includes entry 114. In some embodiments, the subset may be the single directory way that includes entry 114, e.g., directory way 112b. In other embodiments, directory ways may be grouped into a fewer number of larger subsets. As used herein, a "subset" refers to a proper subset that is smaller than the full set. Accordingly, indicator 115 will identify fewer than all directory ways 112. As shown, indicator 115 identifies a subset of directory ways 112 that includes directory ways 112a and 112b. A number of directory ways included in a given indicator may, in some embodiments, be programmable for the coherence directory circuit. In other embodiments, the number may be fixed as part of the design of the coherence directory circuit.

Coherent agent 130a may be configured to receive indicator 115, and store indicator 115 in a location associated with cache block 136. As shown, coherent agent 130a is configured to store indicator 115 in cache tag 139 that corresponds to cache block 136. A size of cache tag tables 138a and 138b may determine a number of bits available for storing indicator 115 in cache tag 139. As described above, a number of directory ways identified by indicator 115 is based on a number of bits available as indicator 115. The number of bits available as indicator 115 is based on the size of cache tag 139. For example, if two bits are available, then each of the four directory ways 112 may be identified individually. If a single bit is available, then directory ways 112 may be divided into two proper subsets, directory ways 112a and 112b as a first subset and directory ways 112c and 112d as a second subset.

It is noted that system 100, as illustrated in FIG. 1, is merely an example. The illustration of FIG. 1 has been simplified to highlight features relevant to this disclosure. Various embodiments may include different configurations of the circuit elements. For example, only two coherent agents are shown. In other embodiments, any suitable number of coherent agents may be included, such as ten, twenty, or more. In addition, four directory ways are shown in coherence directory circuit 110. In other embodiments, any suitable number of directory ways may be included in system 100, such as eight, sixteen, or more. In various embodiments, circuits of system 100 may be implemented using any suitable combination of sequential and combinatorial logic circuits. In addition, register and/or memory circuits, such as SRAM, may be used in these circuits to temporarily hold information such as instructions, data, address values, and the like.

FIG. 1 depicts a case in which a cache block is cached when no other coherent agents are caching the same block. In a system with multiple cache circuits used by multiple coherent agents, the same cache block may be cached by a second coherent agent. Such an example is shown in FIG. 2.

Figure 2:
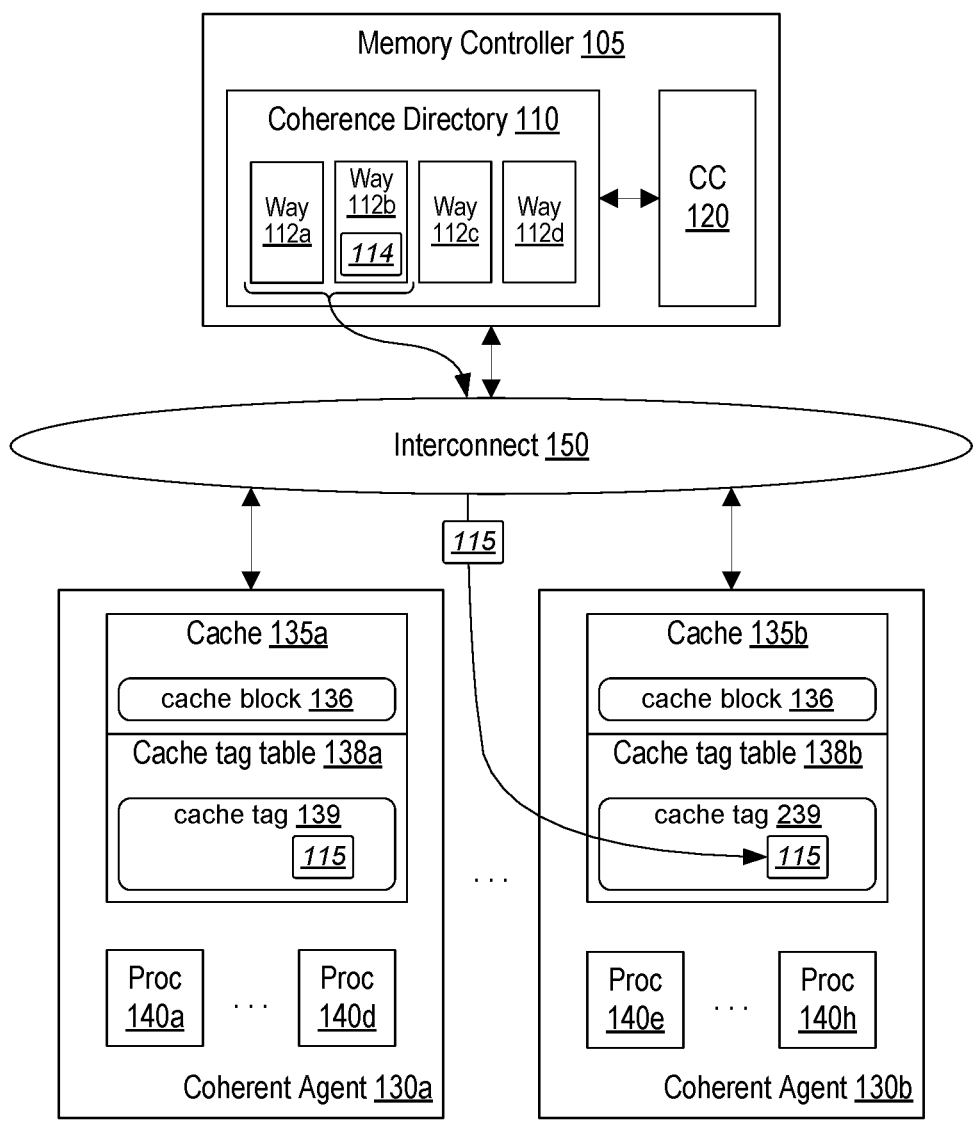
FIG. 2 shows a block diagram of an embodiment of an SOC from the system of FIG. 1 in which a coherent agent caches an existing cache block.

Moving to FIG. 2, the system of FIG. 1 is shown at a subsequent point in time. At this subsequent point in time, coherent agent 130a has cache block 136 stored in cache circuit 135a with corresponding cache tag 139, including indicator 115, stored in cache tag table 138a. Coherence directory circuit 110 includes entry 114 stored in directory way 112b, with entry 114 indicating that coherent agent 130a currently caches a copy of cache block 136.

Coherent agent 130b, as illustrated, issues a memory transaction with the particular address to access the range of values stored in memory circuit 160 starting at the particular address (e.g., cache block 136). In a similar manner as described above for cache circuit 135a, cache circuit 135b may be accessed first to determine if it has a local copy of cache block 136 currently cached. After determining that a local copy is not currently cached in cache circuit 135b, a cache fill request corresponding to the memory transaction is issued to memory controller 105. Memory controller 105 may receive the cache fill request and, in some embodiments, may retrieve the requested values from memory circuit 160. In other embodiments, memory controller 105 may use coherence directory circuit 110 to determine that coherent agent 130a has a local copy of cache block 136, which may be used to fulfill the cache fill request faster than retrieving the values from memory circuit 160. A cache fill response is generated, including the values for cache block 136, and sent to cache circuit 135b. Cache circuit 135b may receive the values in the cache fill response and store cache block 136. Cache circuit 135b may further create a corresponding cache tag 239 in cache tag table 138b, cache tag 239 including similar information as cache tag 139.

Coherence directory circuit 110 may be further configured to, in response to coherent agent 130b caching cache block 136, update entry 114 to include coherent agent 130b. Coherence directory circuit 110 updates entry 114, as depicted, to include a "b" to indicate that coherent agent 130b, in addition to coherent agent 130a, currently has a copy of cache block 136. Coherent agent 130b may be configured to receive indicator 115, and store indicator 115 in a respective location associated with cache block 136, e.g., in cache tag 239.

It is noted that the embodiment of FIG. 2 is one depiction of a system that uses indicators of directory ways in respective cache circuits. As previously described, the elements included in FIG. 2 are included to demonstrate the disclosed techniques. Any suitable number of coherent agents and directory ways may be included in other embodiments.

Figure 3A:
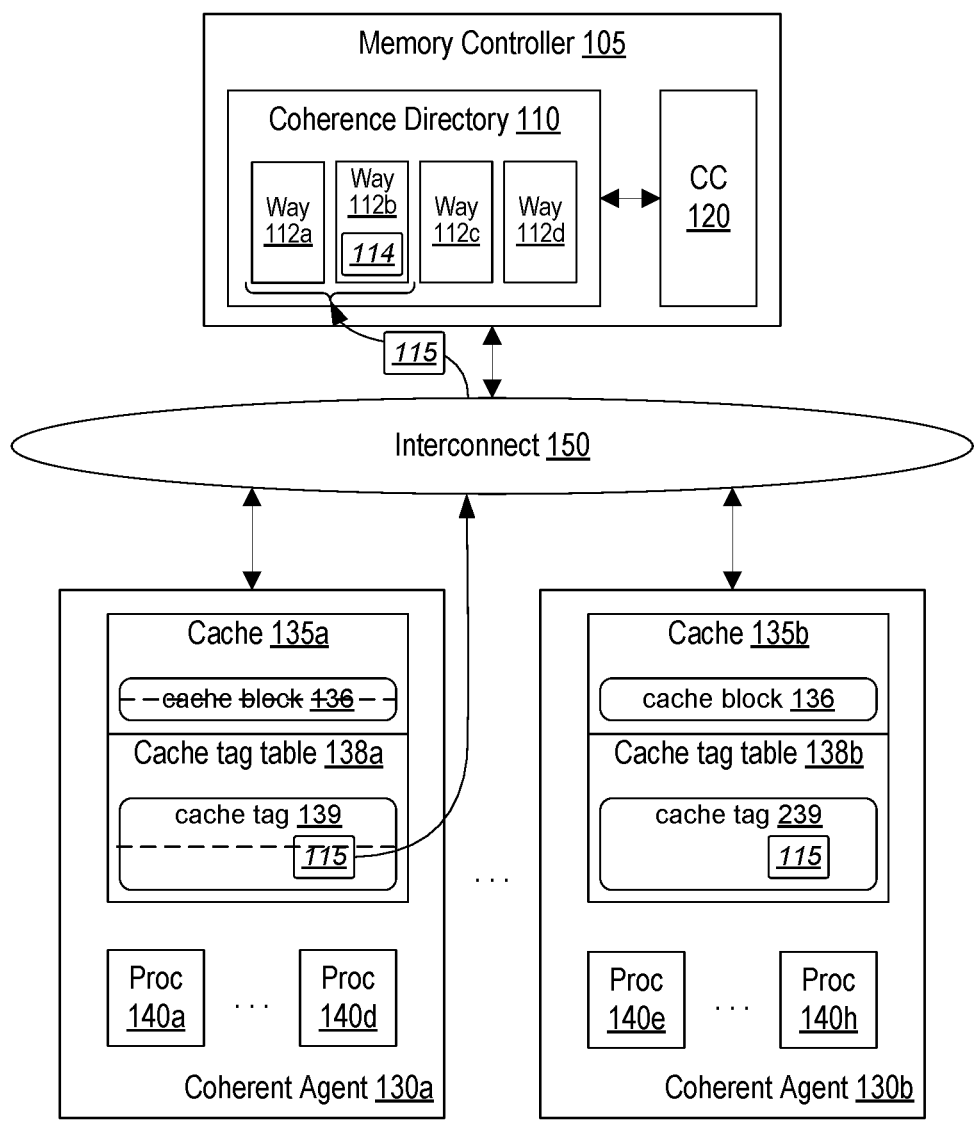
FIGS. 3A and 3B depict different examples of embodiments of the SOC from the system of FIG. 2 in which a coherent agent evicts an existing cache block.

The descriptions of FIGS. 1 and 2 illustrate respective examples of a cache circuit storing a cache block. Cache line states may change over time as memory requests are received in a system such as SOC 101, and a cache block may be evicted from a given cache circuit to free cache space for a different cache block. FIG. 3A depicts an example of a cache circuit evicting a cache block.

Turning to FIG. 3A, the system of FIGS. 1 and 2 is shown at a subsequent point in time to the description of FIG. 2. At this point in time, both coherent agents 130 have respective copies of cache block 136 stored in cache circuits 135a and 135b, respectively. In addition, cache tags 139 and 239 include indicator 115. Coherence directory circuit 110 includes entry 114 stored in directory way 112b, with entry 114 indicating that both coherent agents 130 currently cache a copy of cache block 136.

As illustrated, cache circuit 135a may select cache block 136 for eviction. Cache circuit 135a may use any suitable algorithm for selecting cache block 136, e.g., least recently used, fewest cache hits, and the like. Coherent agent 130a may be further configured to, in response to the eviction of cache block 136, send an indication of the eviction, an identifier for cache block 136, and indicator 115 to coherence directory circuit 110.

Coherence directory circuit 110 may be further configured to, in response to the indication of the eviction, use indicator 115 to select the subset of directory ways 112 to search for entry 114. Since entry 114 is used to indicate which coherent agents currently store a copy of cache block 136, entry 114 needs to be updated to remove coherent agent 130a after the eviction of cache block 136 from cache circuit 135a. As previously described, indicator 115 identifies a proper subset of directory ways 112 in which entry 114 is stored. By using indicator 115, coherence directory circuit 110 may reduce a number of directory ways 112 that need to be searched in order to find entry 114 that is currently associated with cache block 136.

If the subset of directory ways 112 indicated by indicator 115 includes more than one directory way 112, then coherence directory circuit 110 may search the subset of directory ways 112 concurrently. For example, indicator 115 may identify the subset as including directory ways 112a and 112b. To reduce an amount of time used to search each directory way, coherence directory circuit may be configured to search directory ways 112 simultaneously. If, however, a single directory way 112 (e.g., 112b) is identified in indicator 115, then only the indicated directory way may be searched. In some cases, however, coherence directory circuit 110 may receive, from coherent agent 130a, the indication of the eviction of cache block 136 and the identifier for cache block 136, but without indicator 115. In such cases, coherence directory circuit 110 may be configured to search all of directory ways 112 concurrently. Although the concurrent searching may not require additional search time than when indicator 115 is included, searching all four directory ways 112 concurrently may consume more power than if the search were limited to a proper subset of directory ways 112.

As shown, coherence directory circuit 110 may be further configured to, in response to a determination that at least one other coherent agent 130 (e.g., coherent agent 130b) is currently caching a respective copy of cache block 136, update entry 114 to indicate that coherent agent 130a no longer is caching cache block 136. As can be seen at the bottom of FIG. 3A, entry 114 is updated to remove the "a" that was indicative of coherent agent 130a.

It is noted that the system of FIG. 3A is merely an example. A single cache block has been used in FIGS. 1-3A for clarity. In other embodiments, cache circuits 135 may be storing various combinations of cache blocks, many of which may be copies of the same cache block. Accordingly, coherence directory circuit 110 may include more than the single illustrated entry 114.

Figure 3B:
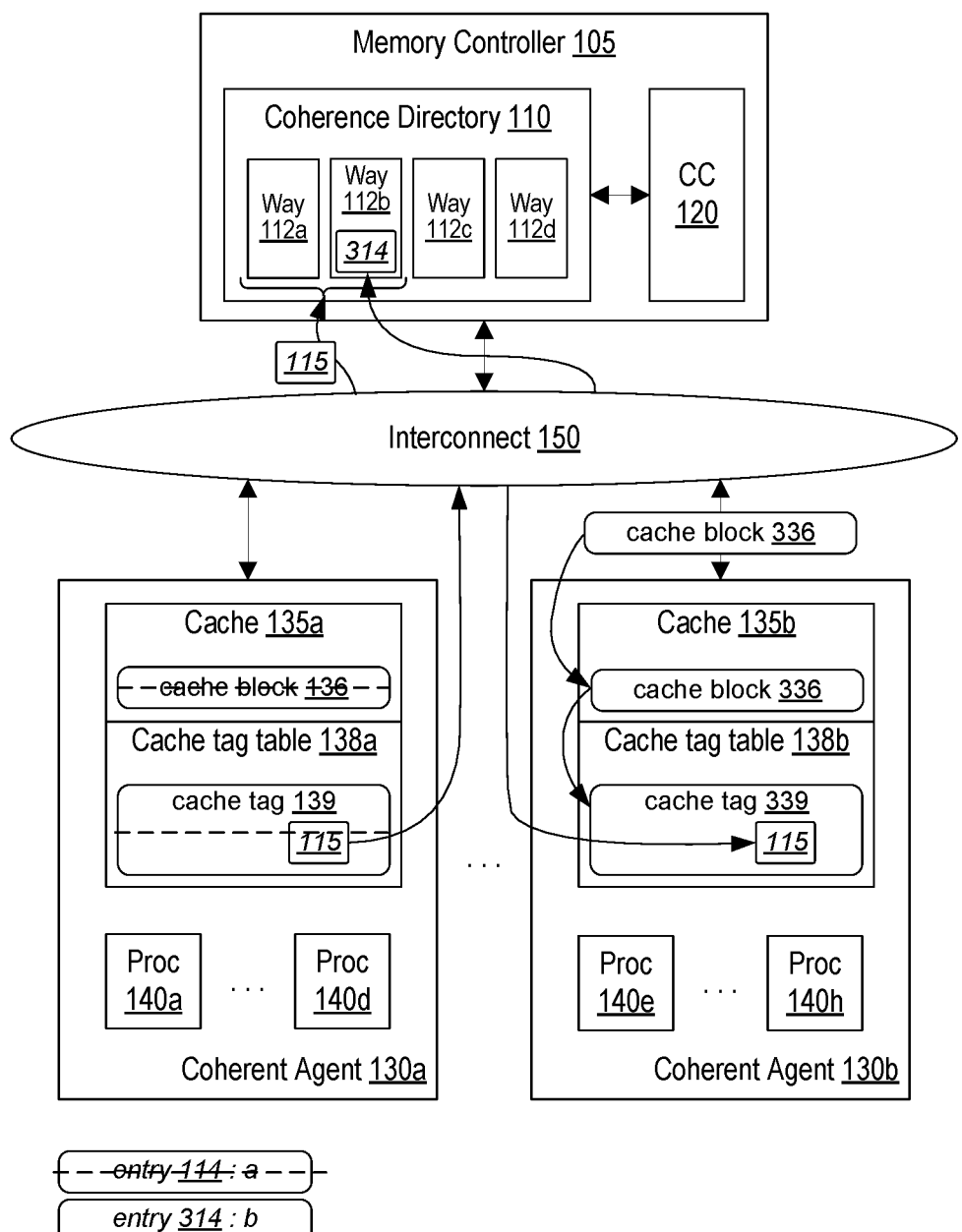

FIG. 3B illustrates how coherence directory circuit 110 may avoid a race condition if coherent agent 130a evicts cache block 136 in an overlapping manner with coherent agent 130b caching cache block 336. In FIG. 3B, cache block 336 corresponds to a different location in a system memory (e.g., memory circuit 160) that happens to map to a same cache block (e.g., a same cache line) as cache block 136.

As illustrated, when cache block 136 is invalidated by coherent agent 130a, coherent agent 130a issues a writeback request to memory controller 105 to store any modified values in cache block 136 to corresponding locations in memory circuit 160. Coherent agent 130b, at a point in time prior to memory controller 105 receiving the writeback request from coherent agent 130a, caches cache block 336 that corresponds to different locations in memory circuit 160, but maps to a same cache location as cache block 136. In response to the caching of cache block 336, coherent directory circuit 110 generates entry 314 to indicate that coherent agent 130b is currently storing cache block 336, and sends indicator 115 to coherent agent 130b, to indicate which set of directory ways 112 includes entry 314. To make room for entry 314, entry 114 is invalidated and coherence directory circuit 110 (prior to receiving the writeback request from coherent agent 130a) sends a command is to coherent agent 130a (as indicated by entry 114) to writeback and invalidate cache block 136.

Coherent agent 130a, as shown, receives the command from coherent directory circuit 110 to writeback and invalidate cache block 136. In response, coherent agent 130a sends an invalidate response that includes writeback data for cache block 136, despite having already sent the original writeback request. Coherence directory circuit 110 receives the original writeback request from coherent agent 130a. Entry 114 has already been invalidated and replaced with entry 314 (that does not identify coherent agent 130a as a holder of cache block 336), the original writeback request is dropped. Instead, the invalidate response from coherent agent 130a, that includes writeback data for cache block 136, is performed when received by memory controller 105.

In a further case, coherent agent 130b may store a new copy of data from memory locations that correspond to cache block 136 after storing cache block 336. For example, one of processor cores 140e-140h may execute code that reads a same location in memory circuit 160 that corresponds to cache block 136. In a multiset-associative cache system, the new copy of cache block 136 data may be mapped to a different way (e.g., way 112c) than it was when coherent agent 130a held cache block 136. In such a case, if the original writeback request from coherent agent 130a were to arrive at memory controller 105 after the new instance of cache block 136 is stored to cache circuit 135b in coherent agent 130b, then the original writeback request from coherent agent 130a is still dropped since coherent agent 130a is not linked to cache block 136 in a current entry of coherence directory circuit 110.

It is noted that the example of FIG. 3B describes particular situations that may occur during operation of a cache coherency system with a plurality of coherent agents having local cache memories. Two coherent agents are illustrated for clarity. In other embodiments, any applicable number of cache circuits 135 may be storing various combinations of cache blocks, including copies of the same cache block. Coherence directory circuit 110, therefore, may include various rules for properly maintaining coherency across the system.

Figure 4:
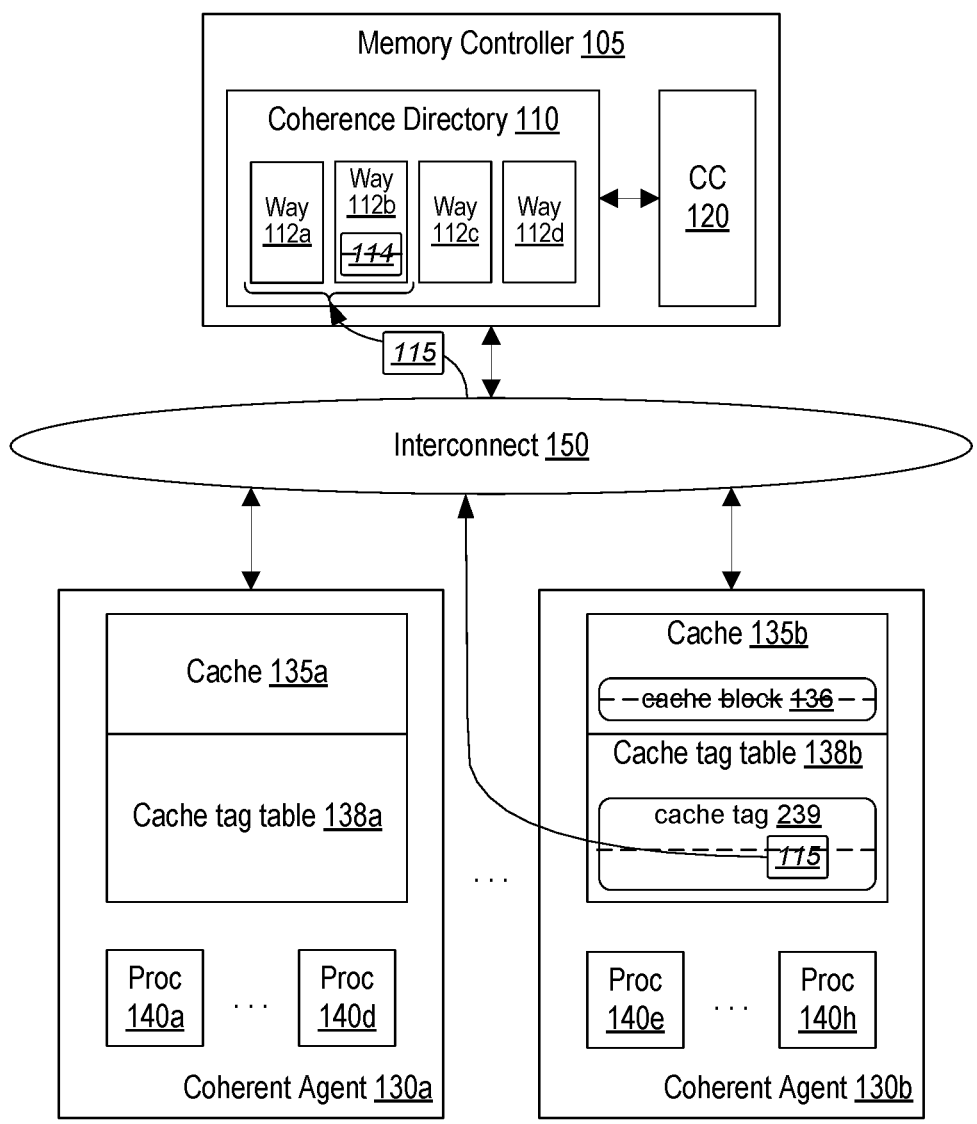
FIG. 4 illustrates a block diagram of an embodiment of the SOC from the system of FIG. 3A in which a different coherent agent evicts the same existing cache block.

FIG. 3B depicts a case for evicting a cache block from a first cache circuit while a different cache circuit stores different data that maps to a same cache block. A coherence directory circuit may perform different actions if no other cache circuit includes a cache block being evicted. FIG. 4 demonstrates such a scenario.

Proceeding to FIG. 4, the system of FIGS. 1-3B is shown at a subsequent point in time to the description of FIG. 3A. At this point in time, both coherent agent 130a has evicted cache block 136 while coherent agent 130b still has a copy of cache block 136 stored in cache circuit 135b, and cache tag 239 includes indicator 115. Coherence directory circuit 110 includes entry 114 stored in directory way 112b, with entry 114 identifying coherent agent 130b.

As illustrated, cache circuit 135b selects cache block 136 for eviction. As described above, cache circuit 135b may use any suitable algorithm for selecting cache block 136. In response to the eviction of cache block 136, coherent agent 130 may send an indication of the eviction, an identifier for the particular cache block, and indicator 115 to coherence directory circuit 110.

In response to the indication of the eviction, coherence directory circuit 110 may use indicator 115 to select the subset of directory ways 112 to search for entry 114. Indicator 115, as disclosed above, identifies a proper subset of directory ways 112, one of which stores entry 114. Using indicator 115 to reduce a number of directory ways 112 that need to be searched in order to find entry 114 may reduce time and/or power consumption used during the search.

As described above, coherence directory circuit 110 may search the subset of directory ways 112 concurrently if the subset of directory ways 112 identified by indicator 115 includes more than one directory way 112, and may search all directory ways 112 concurrently if indicator 115 is omitted. In response to a determination that no other coherent agent 130 is currently caching a respective copy of cache block 136, coherence directory circuit 110 may invalidate entry 114, thereby freeing the entry for use for a different cache block.

Figure 5:
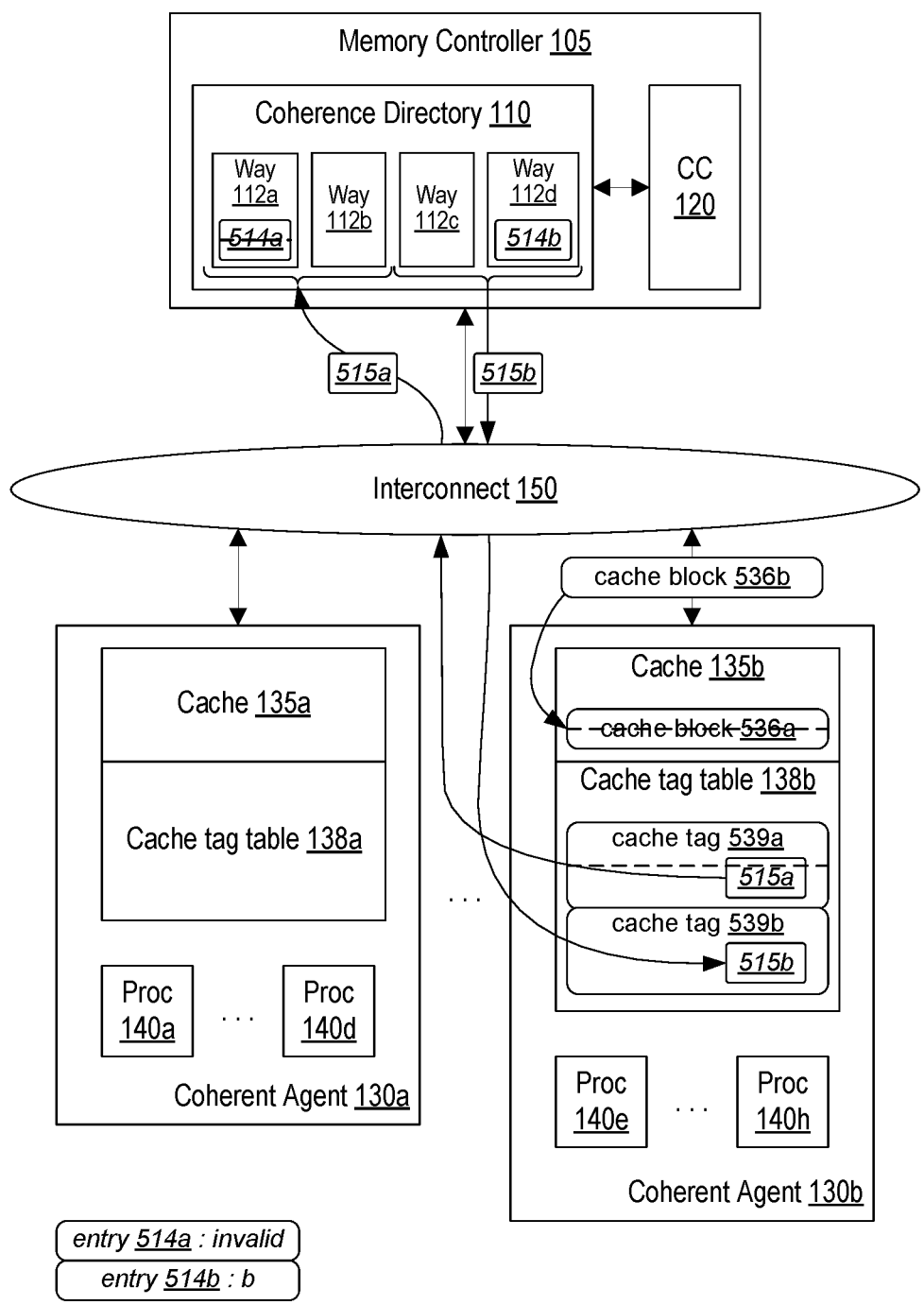
FIG. 5 shows a block diagram of an embodiment of the SOC from the system of FIG. 1 in which a coherent agent evicts an existing cache block to free space to store a different cache block.

It is noted that SOC 101 illustrated in FIG. 4 is an example for demonstrative purpose. FIGS. 1 and 2 describe actions associated with caching a cache block, while FIGS. 3 and 4 depict actions associated with evicting a cache block. In some cases, a coherent agent may evict a cache block to free cache memory for caching a different cache block. FIG. 5 depicts such a case.

Moving to FIG. 5, an example of a coherence directory circuit is depicted in conjunction with a coherent agent concurrently evicting and caching different cache blocks. SOC 101 of FIGS. 1-4 is shown at a point in time at which coherent agent 130b has a copy of cache block 536a stored in cache circuit 135b, and has received cache block 536b to store in cache circuit 135b. Cache tag 539a is currently stored in cache tag table 138b and includes indicator 515a identifying a subset of directory ways 112 in which entry 514a, corresponding to cache block 536a, is stored. Coherence directory circuit 110 includes entry 514a stored in directory way 112a, with entry 514a identifying coherent agent 130b as storing a copy of cache block 536a.

As illustrated, coherent agent 130b is configured to store cache block 536b by evicting cache block 536a. For example, in a similar manner as described above, coherent agent 130b may issue a memory transaction to request data from a particular address in memory circuit 160 of FIG. 1. Cache block 536b corresponds to one or more memory locations that include the particular address. After determining that a local copy of cache block 536b is not currently cached in cache circuit 135b, a cache fill request is issued to retrieve values for cache block 536b from a different memory, e.g., memory circuit 160. After receiving the requested values for cache block 536b, cache circuit 135b determines that one or more locations in cache circuit 135b that may be used to store cache block 536b are currently allotted to other cache blocks. To free one of the one or more locations, cache circuit 135b selects the cache location that currently stores cache block 536a for eviction.

In response to evicting cache block 536a, cache circuit 135b may be configured to send, to coherence directory circuit 110, an eviction notice with indicator 515a and an identifier for cache block 536a. In addition, cache circuit 135b may be further configured to send, to coherence directory circuit 110, a cache fill notice with an identifier for cache block 536b that is replacing cache block 536a.

In response to receiving the eviction notice, coherence directory circuit 110 may be configured to search a subset of directory ways 112 indicated by indicator 515a, e.g., directory ways 112a and 112b. Entry 514a, that is associated with cache block 536a, may be retrieved from directory way 112a and read to determine which coherent agents are currently caching a copy of cache block 536a. In response to a determination that no other coherent agent is currently caching a respective copy of cache block 536a, coherence directory circuit 110 may be configured to invalidate entry 514a. In response to a determination that at least one other coherent agent (e.g., coherent agent 130a) is currently caching a respective copy of cache block 536a, coherence directory circuit may be configured to update entry 514a to indicate that coherent agent 130b no longer is caching cache block 536a.

In response to receiving the cache fill notice associated with cache block 536b, coherence directory circuit 110 may be configured to create entry 514b, associated with cache block 536b, in a selected directory way of directory ways 112 (e.g., directory way 112d). It is noted that, although cache block 536b is being stored in a same location of cache circuit 135b as cache block 536a was stored, different memory addresses for cache block 536a and 536b may result in different mappings within coherence directory circuit 110 as compared to mappings in cache circuit 135b. The memory address associated with a given cache block may be used to identify a particular one or more locations in cache circuits 135 as well as in coherence directory circuit 110. For example, a hash algorithm may be applied the to the memory address (or a portion thereof) to generate a value that maps to a particular location in the cache circuits 135 and coherence directory circuit 110. Cache circuits 135, as well as coherence directory circuit 110, may each use different hash algorithms, thereby mapping a same address to different locations. Even within a given cache circuit 135 or in coherence directory circuit 110, each way may use a different hash algorithm. According, the memory address for cache block 536b may be used to map entry 514b into a different location than entry 514a.

After entry 514b has been generated, coherence directory circuit 110 may be configured to send, to coherent agent 130b, indicator 515b that indicates a subset of directory ways 112 that hold entry 514b. In response to receiving indicator 515b, coherent agent 130b may store indicator 515b for later use if/when cache block 536b is evicted. In some embodiments, coherent agent 130b may be further configured to, in response to receiving indicator 515b, store indicator 515b in cache tag 539b that is associated with cache block 536b. In other embodiments, coherent agent 130b may be further configured to, in response to receiving indicator 515b, store indicator 515b in a way indicator table (not illustrated) that is accessed using cache tag 539b for cache block 536b.

In some embodiments, such as illustrated, coherent agent 130b may be a processor complex that includes a plurality of processor cores 140e-140h. Processor cores 140e-140h may have respective individually-programmable directory marker enable bits. These directory marker enable bits may be used to enable or disable support for storing a received indicator from coherence directory circuit 110. Accordingly, a given one of processor cores 140e-140h may be configured to store indicator 515b received from coherence directory circuit 110 if the respective directory marker enable bit is set, and ignore indicator 515b if the respective directory marker enable bit is reset. In the example above, the memory transaction to request the data from the particular address in memory circuit 160 may be issued by a particular one of processor cores 140e-140h. If, for example, processor core 140e has its respective directory marker enable bit set and processor core 140f has its respective directory marker enable bit reset, then indicator 515b will be stored as described if processor core 140e issued the memory transaction. If processor core 140f issued the memory transaction, then indicator 515b will be ignored and may be discarded. If indicator 515b is ignored, then when cache block 536b is evicted, no indicator will be sent to coherence directory circuit 110 along with the eviction notice. Coherence directory circuit 110 may, therefore, search all of directory ways 112 to find entry 514b in response to the eviction notice, thereby consuming additional power and/or taking longer to complete the search.

It is noted that the embodiment of FIG. 5 is merely an example. For clarity, an example of evicting a cache block to free cache space for a different cache is shown for a single coherent agent. In other embodiments, caching and evicting blocks to and from cache circuits may occur concurrently by various cache circuits across SOC 101. Although only two coherent agents are shown, any suitable number of coherent agents, corresponding to a variety of processing circuits, may be included in other embodiments.

To summarize, various embodiments of a system may include a plurality of coherent agent circuits, and a coherence directory circuit that includes a plurality of directory ways for storing coherency information associated with the plurality of coherent agent circuits. A given coherent agent circuit of the plurality of coherent agent circuits may include a respective cache circuit. The coherence directory circuit may be configured to determine that a particular cache block that is not currently cached among the plurality of coherent agent circuits, is initially stored in a first one of the coherent agent circuits. The coherence directory circuit may be further configured to, in response to this determination, create a particular entry in a selected directory way of the plurality of directory ways. The coherence directory circuit may also be configured to send, to the first coherent agent circuit, an indicator identifying a subset of the plurality of directory ways that includes the particular entry. In response to a second coherent agent circuit caching the particular cache block, the coherence directory circuit may update the particular entry to include the second coherent agent circuit. The first and second coherent agent circuits may be configured to receive respective copies of the indicator, and to store the respective copies in locations associated with the particular cache block.

In a further example, the first coherent agent circuit may be further configured to, in response to evicting the particular cache block, send an indication of the eviction, an identifier for the particular cache block, and the indicator to the coherence directory circuit. The coherence directory circuit may be further configured to, in response to the indication of the eviction, use the indicator to select the subset of the plurality of directory ways to search for the particular entry.

In another example, the coherence directory circuit may be further configured to, in response to a determination that no other coherent agent is currently caching a respective copy of the particular cache block, invalidate the particular entry. In an example, the coherence directory circuit may also be configured to, in response to a determination that at least one other coherent agent circuit is currently caching a respective copy of the particular cache block, update the particular entry to indicate that the first coherent agent circuit no longer is caching the particular cache block.

In a further example, the coherence directory circuit may also be configured to, in response to a determination that the subset includes more than one directory way, search the subset of directory ways concurrently. In another example, the coherence directory circuit may be further configured to, in response to receiving, from a given coherent agent, an indication of an eviction of a given cache block and an identifier for the given cache block without an associated indicator, search the plurality of directory ways concurrently.

In an example, the indicator may identify a single one of the plurality of directory ways. In another example, the first coherent agent circuit may be configured to store the indicator in a cache tag for the particular cache block.

The circuits and techniques described above in regards to FIGS. 1-5 may manage a coherence directory circuit for a plurality of cache memories using a variety of methods. Four methods associated with a coherence directory circuit are described below in regards to FIGS. 6-9. In some embodiments, the operations of the disclosed methods may be performed using instructions included in a non-transient, computer-readable memory having program instructions being executable by processor circuits in the systems to cause the operations described with reference to FIGS. 6-9.

Moving now to FIG. 6, a flow diagram for an embodiment of a method for sending, by a coherence directory circuit, a directory way indicator to a coherent agent is shown. Method 600 may be performed by a system, such as SOC 101 in FIGS. 1-5. Method 600 is described below using system 100 of FIG. 1 as an example. References to elements in FIG. 1 are included as non-limiting examples.

Method 600 begins at block 610 with a particular one of a plurality of coherent agent circuits storing a particular cache block in a respective cache circuit. For example, coherent agent 130a receives and stores cache block 136 in cache circuit 135a. Coherence agent 130a may, in response to caching cache block 136, also create cache tag 139 in cache tag table 138a. In some embodiments, cache block 136 may be received by coherent agent 130a as a cache fill in response to a memory transaction issued by one of processor cores 140a-140d.

Method 600 continues at block 620 with the particular coherent agent circuit sending, to a coherence directory circuit, a fill notice including an indication of the particular cache block. As shown in FIG. 1, for example, coherence agent 130a sends an indication of the cache fill that resulted in cache block 136 being stored in cache circuit 135a. This fill notice may include an identifier indicative of an address, or address range associated with cache block 136.

At block 630, method 600 proceeds with the coherence directory circuit, in response to determining that an entry associated with the particular cache block does not currently exist, creating a particular entry in a selected directory way of a plurality of directory ways. As illustrated, coherence directory circuit 110 may use the received identifier to determine if an entry corresponding to cache block 136 already exist in one of directory ways 112. In response to determining that no current entry exist, coherence directory circuit 110 creates entry 114 in directory way 112b. The location for entry 114 may be determined using the received identifier, e.g., by performing a hash algorithm on the received identifier to generate a hash value. In some embodiments, this hash value may be mapped to different locations in each od directory ways 112. In other embodiments, a different hash value may be calculated from the received identifier for each of directory ways 112. One of the four directory ways 112 is selected using one or more criteria, such as current availability of the mapped location, least recently used directory way 112, a round robin technique, and the like.

Method 600 proceeds at block 640 with the coherence directory circuit sending, to the particular coherent agent circuit, an indicator identifying a subset of the plurality of directory ways that includes the particular entry. For example, coherence directory circuit 110 assigns a value to indicator 115 that identifies that entry 114 is stored in directory way 112b. In some embodiments, indicator 115 may identify both directory ways 112a and 112b to reduce a number of bits used in indicator 115.

At block 650, method 600 continues with the particular coherent agent circuit storing the indicator in a location associated with the particular cache block. As shown, coherent agent 130a, in response to receiving indicator 115, stores indicator 115 in cache tag 139 that is associated with cache block 136. In other embodiments, coherent agent 130a may store indicator 115 in a way indicator table, using cache tag 139 to determine a particular location in the way indicator table to store indicator 115.

It is noted that the method of FIG. 6 includes blocks 610-650. Method 600 may end in block 650 or may repeat some or all blocks of the method. For example, method 600 may repeat in response to another cache fill indication from one of coherent agents 130. Method 600 may be performed concurrently with a different instance of method 600. For example, coherent agent 130a may send a cache fill notice to coherence directory circuit 110 while coherence directory circuit 110 is processing a cache fill notice from coherent agent 130b.

Figure 7:
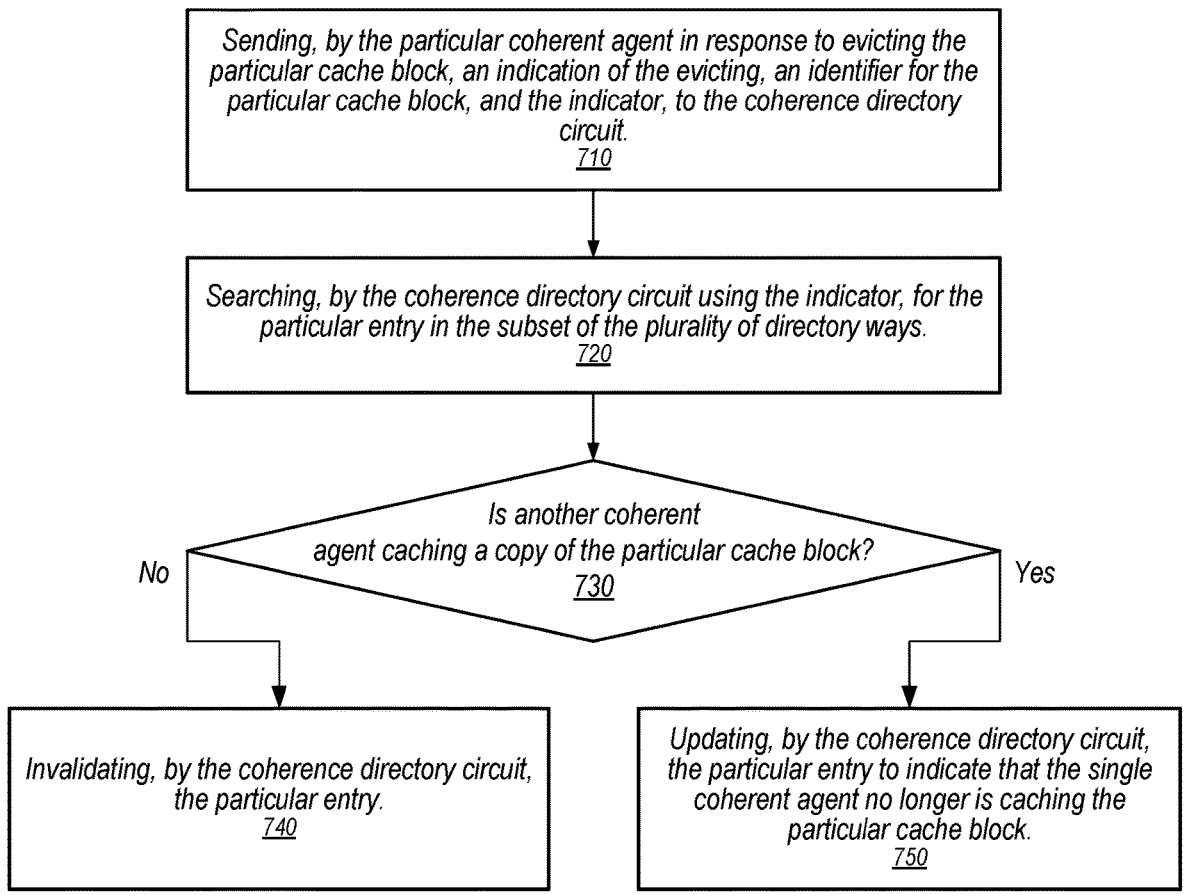
FIG. 7 shows a flow diagram of an embodiment of a method for using a directory way indicator to modify a coherence entry in an indicated directory way.

Turning now to FIG. 7, a flow diagram for an embodiment of a method for receiving, by a coherence directory circuit, an eviction notice from a coherent agent is illustrated. In a similar manner as method 600, method 700 may be performed by a system, such as SOC 101 in FIGS. 1-5. Method 700 is described below using SOC 101 of FIGS. 3 and 4 as examples. References to elements in FIGS. 3 and 4 are included as non-limiting examples. Method 700 may begin with a particular coherent agent having evicted a particular cache block for which a directory way indicator was stored.

At block 710, method 700 begins with the particular coherent agent, in response to evicting the particular cache block, sending, an indication of the evicting, an identifier for the particular cache block, and the indicator, to the coherence directory circuit. For example, cache circuit 135a may select cache block 136 for eviction as shown in FIG. 3A. In response to the eviction of cache block 136, coherent agent 130a may send an indication of the eviction, an identifier for cache block, and the previously stored indicator 115 to coherence directory circuit 110. Including indicator 115 with the notice of the eviction may enable coherence directory circuit 110 to narrow down a search for entry 114 that tracks which coherence agents are currently caching copies of cache block 136 by indicating a subset of directory ways 112 where entry 114 is stored.

Method 700 continues at block 720 with the coherence directory circuit searching, using the indicator, for a particular entry in the subset of the plurality of directory ways. For example, coherence directory circuit 110 may, in response to receiving the indication of the eviction, use indicator 115 to select directory ways 112a and 112b to search for entry 114. As disclosed above, using indicator 115 may limit a number of directory ways 112 that need to be searched to find entry 114, currently associated with cache block 136. The number of directory ways 112 that are identified by indicator 115 may include any proper subset of directory ways 112. As shown, the subset includes directory ways 112a and 112b. In some embodiments, directory ways 112a and 112b may be searched concurrently to reduce an amount of time for finding entry 114. Under some operating conditions, however, concurrent searching of directory ways 112a and 112b may consume more power than is currently available and directory ways 112a and 112b may be search serially instead.

At block 730, method 700 continues by determining whether another coherent agent is caching a copy of the particular cache block. coherence directory circuit 110 may read entry 114 to determine which coherent agents currently store a copy of cache block 136 other than coherent agent 130a. If no other coherent agent currently has a copy of cache block 136, then method 700 proceeds to block 740. Otherwise, as long as at least one other coherent agent has a copy of cache block 136, then method 700 moves to block 750.

If no other coherent agent is caching a copy of the particular cache block, then method 700 continues at block 740 with the coherence directory circuit invalidating the particular entry that is associated with the particular cache block. For example, of coherent agent 130b (or any other coherent agent in SOC 101 that is not shown) does not have a copy of cache block 136, then entry 114 is no longer needed. Coherence directory circuit 110 may invalidate entry 114, freeing the location in directory way 112b for use with a different entry for a different cache block.

If at least one other coherent agent is caching a copy of the particular cache block, then method 700 instead continues at block 750 with the coherence directory circuit updating the particular entry to indicate that the particular coherent agent circuit no longer is caching the particular cache block. Coherence directory circuit 110 may, for example, identify the indicator for coherence agent 130a in entry 114 and delete or reset the indicator such that only indicators for the other coherent agents indicated remain in the updated entry 114. As shown in FIG. 3A, a value indicative of coherence agent 130a is removed from entry 114, leaving just the value indicative of coherent agent 130b remaining.

In some embodiments, method 700 may end in block 740 or 750, or in other embodiments, may repeat some or all operations. For example, method 700 may return to block 710 if another cache block is evicted by one of coherent agents 130. Method 700, similar to method 600, may be performed concurrently with a different instance of methods 600 and/or 700. For example, coherent agent 130a may send a cache fill notice to coherence directory circuit 110 while coherence directory circuit 110 is processing an eviction notice from coherent agent 130b.

Proceeding now to FIG. 8, a flow diagram for an embodiment of another method for sending, by a coherence directory circuit, a directory way indicator to a coherent agent is shown. Similar to methods 600 and 700, method 800 may be performed by a system, such as SOC 101 in FIGS. 1-5. Method 800 is described below using SOC 101 of FIG. 2 as an example. References to elements in FIG. 2 are included as non-limiting examples. Method 800 may be performed after a particular coherent agent has stored a local copy of a particular cache block, and a coherence directory circuit has generated a corresponding entry and sent a directory way indicator for the entry to the particular coherent agent.

Method 800 begins at block 810 with a different one of the plurality of coherent agent circuits storing the particular cache block in a different cache circuit. For example, one of processor cores 140e-140h in coherent agent 130b may issue a memory transaction to access a memory location in the range of values corresponding to cache block 136, which is currently stored in cache circuit 135a of coherent agent 130a. After determining that coherent agent 130b does not have a local copy cached in cache circuit 135b, a cache fill request is issued to memory controller 105. Memory controller 105 may receive the cache fill request and, in some embodiments, may retrieve the requested values from memory circuit 160. In other embodiments, memory controller 105 may use coherence directory circuit 110 to determine that coherent agent 130a has a local copy of cache block 136, which may be used to fulfill the cache fill request faster than retrieving the values from memory circuit 160. Cache circuit 135b may receive and store cache block 136 in response to the cache fill request and generate a corresponding cache tag 239 in cache tag table 138b.

At block 820, method 800 continues with the different coherent agent circuit sending, to the coherence directory circuit, a fill notice including an indication of the particular cache block. For example, coherence agent 130b may send an indication of the cache fill that resulted in cache block 136 being stored in cache circuit 135b. This fill notice includes an identifier corresponding to cache block 136.

Method 800 proceeds at block 830 with the coherence directory circuit updating the particular entry to include the different coherent agent. In response to coherent agent 130b caching cache block 136, coherence directory circuit 110 may, e.g., update entry 114 to include an identifier for coherent agent 130b. Coherence directory circuit 110 updates entry 114, as depicted, to include a "b" to indicate that coherent agent 130b, in addition to coherent agent 130a, currently has a copy of cache block 136.

At block 840, the method proceeds with the coherence directory circuit sending, the indicator to the different coherent agent. For example, coherence directory circuit 110 may have created indicator 115 after coherent agent 130a previously stored cache block 136. In some embodiments, coherence directory circuit 110 may have predefined indicator values for indicator 115 that are selected based on the directory way 112 used to store respective entries, and then sent to ones of coherent agents 130 in response to cache fill notices. In other embodiments, indicator 115 may be generated for each coherent agent in response to a cache fill notice. For example, cache tag tables in different coherent agents may be capable of storing different sized directory way indicators. Cache tag table 138a for coherent agent 130a may only have one bit reserved for the directory way indicator while cache tag table 138b may have two bits reserved. Accordingly, indicator 115 for coherent agent 130a may include both directory ways 112a and 112b in order to fit a single bit, while indicator 115 for coherent agent 130b may identify just directory way 112b using two bits.

Method 800 continues at block 850 with the different coherent agent circuit storing the indicator in a respective location associated with the particular cache block. Coherent agent 130b may be configured to receive indicator 115, and store indicator 115 in a respective location associated with cache block 136, e.g., in cache tag 239. In other embodiments, coherent agent 130b may store indicator 115 in a way indicator table, using cache tag 239 to determine a particular location in the way indicator table to store indicator 115.

It is noted that method 800 may end in block 850, or may repeat some or all operations. For example, method 800 may return to block 810 in response to another coherent agent caching the particular cache block. Performance of various operations of methods 600, 700, and 800 may be performed concurrently and/or in an interleaved fashion. For example, coherence directory circuit 110 may be configured to manage multiple cache fill and/or eviction notices concurrently. For example, coherence directory circuit 110 may receive an eviction notice from coherent agent 130a and a cache fill notice from coherent agent 130b at overlapping points in time. Accordingly, method 800 may be performed concurrent with method 700.

Moving to FIG. 9, a flow diagram for an embodiment of a method for disabling directory way indicators for a coherent agent is shown. Similar to methods 600-800, method 900 may be performed by a system, such as SOC 101 in FIGS. 1-5. Method 900 is described below using SOC 101 of FIG. 1 as an example. References to elements in FIG. 1 are included as non-limiting examples.

Method 900 begins at block 910 with a coherent agent circuit, which has received a directory marker disable signal, storing a cache block in a cache circuit. For example, coherence agent 130b may receive a directory marker disable signal that disables the use of directory way indicators for coherence agent 130b. If coherent agent 130a, in contrast, does not receive a directory marker disable signal, then coherent agent 130a may continue to utilize directory way indicators. In a manner as described above, coherent agent 130b stores cache block 136 after receiving the directory marker disable signal, and sends, to coherence directory circuit 110, a cache fill notice including an indication identifying cache block 136.

At block 920, method 900 continues with the coherence directory circuit, in response to determining that an entry associated with the cache block does not currently exist, creating an entry in one of the plurality of directory ways. In a manner as disclosed above, coherence directory circuit 110 may use the received identifier to determine if an entry corresponding to cache block 136 already exist in one of directory ways 112. In response to determining that no current entry exist, coherence directory circuit 110 creates entry 114 in directory way 112b.

At block 930, method 900 proceeds with the coherence directory circuit sending an indicator for the directory way to the coherent agent. For example, coherence directory circuit 110 assigns a value to indicator 115 that identifies that entry 114 is stored in directory way 112b. As previously described, indicator 115 may identify both directory ways 112a and 112b to reduce a number of bits used in indicator 115. Coherence directory circuit 110 may then send indicator 115 to coherent agent 130b.

Method 900 continues at block 940 with the coherent agent circuit ignoring the indicator. As previously described, a coherent agent stores the indicator when received from the coherence directory circuit. In the present example, however, coherent agent 130b has received a directory marker disable signal, thereby disabling use of indicator 115 by coherent agent 130b. Accordingly, coherent agent 130b ignores indicator 115.

In some embodiments, coherent agent 130b may be a processor complex that includes a plurality of processor cores 140e-140h. Processor cores 140e-140h may have respective individually-programmable directory marker enable bits. Accordingly, a given one of processor cores 140e-140h may be configured to store indicator 115 if the respective directory marker enable bit is set, and ignore indicator 115 if the respective directory marker enable bit is reset. If, for example, processor core 140e has its respective directory marker enable bit set and processor core 140f has its respective directory marker enable bit reset, then indicator 115 will be stored as previously described if processor core 140e issued the memory transaction. If processor core 140f issued the memory transaction, then indicator 115 is ignored.

Method 900 proceeds at block 950 with the coherent agent circuit, in response to evicting the cache block, sending, to the coherence directory circuit, an indication of the evicting without the indicator. As has been disclosed, coherent agent 130b may evict cache block 136 for a variety of reasons. In response to evicting cache block 136, coherent agent 130b sends an eviction notice to coherence directory circuit 110. Since indicator 115 was ignored in block 940, no indicator is sent to coherence directory circuit 110 with the eviction notice.

At block 960, method 900 continues with the coherence directory circuit, in response to the indication of the evicting without the indicator, searching for the entry in the plurality of directory ways. Since indicator 115 is not included with the eviction notice, coherence directory circuit 110 may have to search all of directory ways 112 to find entry 114, thereby consuming additional power and/or taking longer to complete the search. The directory marker disable signal may be asserted for a variety of reasons. In some embodiments, certain coherent agents may not have room in the respective cache tags or other memory circuits in which to store directory way indicators. In such cases, the directory marker disable signal may be permanently asserted for these coherent agents. In other embodiments, a directory marker disable signal may be asserted temporarily, for example, during a test or evaluation operation on SOC 101. After such an operation has completed, the directory marker disable signal may be de-asserted and the coherent agent may be enabled to utilize directory way indicators.

It is noted that method 900 may end in block 960, or may repeat some or all operations. For example, method 900 may return to block 910 in response to another coherent agent caching a given cache block while a corresponding directory marker disable signal is enabled. As described above, performance of methods 600-900 may occur concurrently and/or in an interleaved fashion. For example, coherence directory circuit 110 may be configured to manage multiple cache fill and/or eviction notices concurrently. For example, coherence directory circuit 110 may receive an eviction notice from coherent agent 130*a* and a cache fill notice from coherent agent 130*b* while a corresponding directory marker disable signal is enabled. Accordingly, method 900 may be performed concurrent with method 700.

Figure 10:
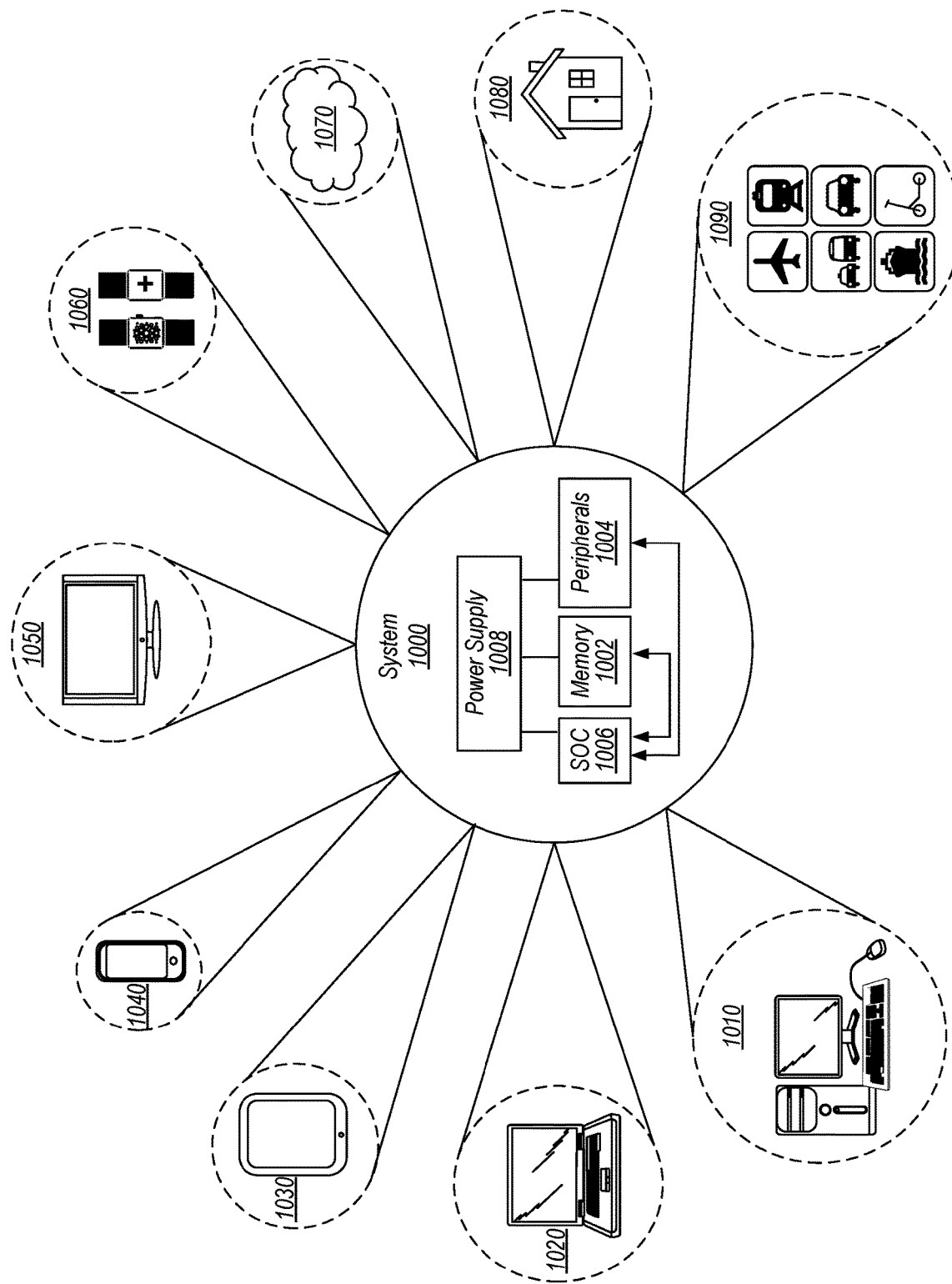
FIG. 10 shows various embodiments of systems that include coupled integrated circuits.

FIGS. 1-9 illustrate circuits and methods for a system, such as an SOC, that includes a coherence directory circuit for tracking coherency of cached blocks across a plurality of coherent agent circuits. Any embodiment of the disclosed systems may be included in one or more of a variety of computer systems, such as a desktop computer, laptop computer, smartphone, tablet, wearable device, and the like. In some embodiments, the circuits described above may be implemented on a system-on-chip (SOC) or other type of integrated circuit, including multi-die packages. A block diagram illustrating an embodiment of system 1000 is illustrated in FIG. 10. System 1000 may, in some embodiments, include any disclosed embodiment of systems disclosed herein, such as SOC 101 shown in FIGS. 1-5.

In the illustrated embodiment, the system 1000 includes at least one instance of a system on chip (SOC) 1006 which may include multiple types of processor circuits, such as a central processing unit (CPU), a graphics processing unit (GPU), or otherwise, a communication fabric, and interfaces to memories and input/output devices. SOC 1006 may correspond to an instance of the SOCs disclosed herein. In various embodiments, SOC 1006 is coupled to external memory circuit 1002, peripherals 1004, and power supply 1008.

A power supply 1008 is also provided which supplies the supply voltages to SOC 1006 as well as one or more supply voltages to external memory circuit 1002 and/or the peripherals 1004. In various embodiments, power supply 1008 represents a battery (e.g., a rechargeable battery in a smart phone, laptop or tablet computer, or other device). In some embodiments, more than one instance of SOC 1006 is included (and more than one external memory circuit 1002 is included as well).

External memory circuit 1002 is any type of memory, such as dynamic random-access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. In some embodiments, external memory circuit 1002 may include non-volatile memory such as flash memory, ferroelectric random-access memory (FRAM), or magnetoresistive RAM (MRAM). One or more memory devices may be coupled onto a circuit board to form memory modules such as single inline memory modules (SIMMs), dual inline memory modules (DIMMs), etc. Alternatively, the devices may be mounted with a SOC or an integrated circuit in a chip-on-chip configuration, a package-on-package configuration, or a multi-chip module configuration.

The peripherals 1004 include any desired circuitry, depending on the type of system 1000. For example, in one embodiment, peripherals 1004 includes devices for various types of wireless communication, such as Wi-Fi, Bluetooth, cellular, global positioning system, etc. In some embodiments, the peripherals 1004 also include additional storage, including RAM storage, solid state storage, or disk storage. The peripherals 1004 include user interface devices such as a display screen, including touch display screens or multi-touch display screens, keyboard or other input devices, microphones, speakers, etc.

As illustrated, system 1000 is shown to have application in a wide range of areas. For example, system 1000 may be utilized as part of the chips, circuitry, components, etc., of a desktop computer 1010, laptop computer 1020, tablet computer 1030, cellular or mobile phone 1040, or television 1050 (or set-top box coupled to a television). Also illustrated is a smartwatch and health monitoring device 1060. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. In various embodiments, the above-mentioned smartwatch may or may not include some or any health monitoring related functions. Other wearable devices 1060 are contemplated as well, such as devices worn around the neck, devices attached to hats or other headgear, devices that are implantable in the human body, eyeglasses designed to provide an augmented and/or virtual reality experience, and so on.

System 1000 may further be used as part of a cloud-based service(s) 1070. For example, the previously mentioned devices, and/or other devices, may access computing resources in the cloud (i.e., remotely located hardware and/or software resources). Still further, system 1000 may be utilized in one or more devices of a home 1080 other than those previously mentioned. For example, appliances within the home may monitor and detect conditions that warrant attention. Various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 10 is the application of system 1000 to various modes of transportation 1090. For example, system 1000 may be used in the control and/or entertainment systems of aircraft, trains, buses, cars for hire, private automobiles, waterborne vessels from private boats to cruise liners, scooters (for rent or owned), and so on. In various cases, system 1000 may be used to provide automated guidance (e.g., self-driving vehicles), general systems control, and otherwise.

It is noted that the wide variety of potential applications for system 1000 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 10 are illustrative only and are not intended to be limiting. Other devices are possible and are contemplated.

As disclosed in regards to FIG. 10, system 1000 may include one or more integrated circuits included within a personal computer, smart phone, tablet computer, or other type of computing device. A process for designing and producing an integrated circuit using design information is presented below in FIG. 11.

Figure 11:
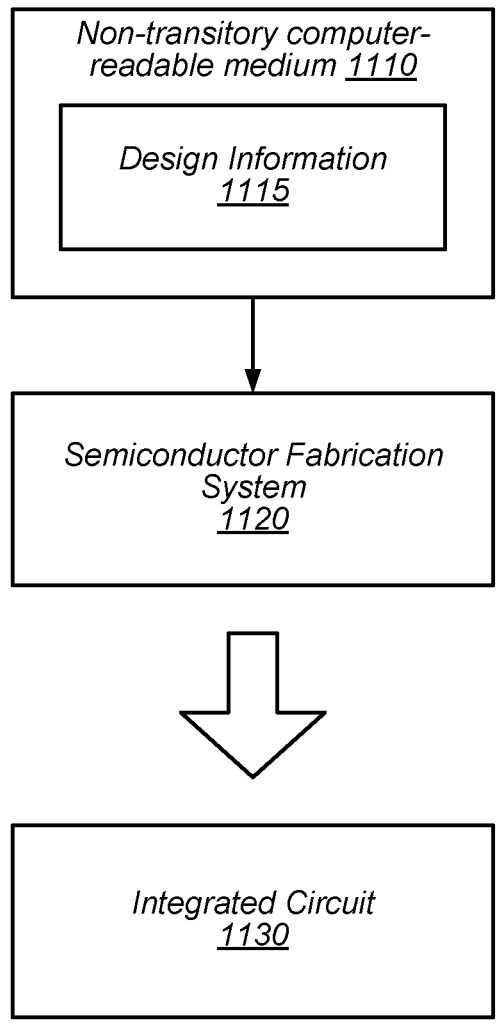
FIG. 11 depicts a block diagram of an example computer-readable medium, according to some embodiments.

FIG. 11 is a block diagram illustrating an example of a non-transitory computer-readable storage medium that stores circuit design information, according to some embodiments. The embodiment of FIG. 11 may be utilized in a process to design and manufacture integrated circuits, for example, including one or more instances of SOC (or portions thereof) 101 that is disclosed above. In the illustrated embodiment, semiconductor fabrication system 1120 is configured to process the design information 1115 stored on non-transitory computer-readable storage medium 1110 and fabricate integrated circuit 1130 based on the design information 1115.

Non-transitory computer-readable storage medium 1110, may comprise any of various appropriate types of memory devices or storage devices. Non-transitory computer-readable storage medium 1110 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1110 may include other types of non-transitory memory as well or combinations thereof. Non-transitory computer-readable storage medium 1110 may include two or more memory mediums which may reside in different locations, e.g., in different computer systems that are connected over a network.

Design information 1115 may be specified using any of various appropriate computer languages, including hardware description languages such as, without limitation: VHDL, Verilog, SystemC, SystemVerilog, RHDL, M, MyHDL, etc. Design information 1115 may be usable by semiconductor fabrication system 1120 to fabricate at least a portion of integrated circuit 1130. The format of design information 1115 may be recognized by at least one semiconductor fabrication system, such as semiconductor fabrication system 1120, for example. In some embodiments, design information 1115 may include a netlist that specifies elements of a cell library, as well as their connectivity. One or more cell libraries used during logic synthesis of circuits included in integrated circuit 1130 may also be included in design information 1115. Such cell libraries may include information indicative of device or transistor level netlists, mask design data, characterization data, and the like, of cells included in the cell library.

Integrated circuit 1130 may, in various embodiments, include one or more custom macrocells, such as memories, analog or mixed-signal circuits, and the like. In such cases, design information 1115 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 is configured to operate according to a circuit design specified by design information 1115, which may include performing any of the functionality described herein. For example, integrated circuit 1130 may include any of various elements shown or described herein. Further, integrated circuit 1130 may be configured to perform various functions described herein in conjunction with other components.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A system comprising:
    a plurality of coherent agent circuits, wherein a given coherent agent circuit of the plurality of coherent agent circuits includes a respective cache circuit;
    a coherence directory circuit including a plurality of directory ways for storing coherency information associated with the plurality of coherent agent circuits, and is configured to:
        in response to a determination that a particular cache block, that is not currently cached among the plurality of coherent agent circuits, is initially stored in a first one of the coherent agent circuits, create a particular entry in a selected directory way of the plurality of directory ways;
send, to the first coherent agent circuit, an indicator identifying a subset of the plurality of directory ways that includes the particular entry; and
in response to a second coherent agent circuit caching the particular cache block, update the particular entry to include the second coherent agent circuit; and
wherein the first and second coherent agent circuits are configured to:
receive respective copies of the indicator; and
store the respective copies of the indicator in locations associated with the particular cache block.

2. The system of claim 1, wherein the first coherent agent circuit is further configured to:
in response to evicting the particular cache block, send an indication of the eviction, an identifier for the particular cache block, and the indicator to the coherence directory circuit; and
wherein the coherence directory circuit is further configured to:
in response to the indication of the eviction, use the indicator to select the subset of the plurality of directory ways to search for the particular entry.

3. The system of claim 2, wherein the coherence directory circuit is further configured to:
in response to a determination that no other coherent agent is currently caching a respective copy of the particular cache block, invalidate the particular entry.

4. The system of claim 2, wherein the coherence directory circuit is further configured to:
in response to a determination that at least one other coherent agent circuit is currently caching a respective copy of the particular cache block, update the particular entry to indicate that the first coherent agent circuit no longer is caching the particular cache block.

5. The system of claim 2, wherein the coherence directory circuit is further configured to:
in response to a determination that the subset includes more than one directory way, search the subset of directory ways concurrently.

6. The system of claim 1, wherein the coherence directory circuit is further configured to:
in response to receiving, from a given coherent agent, an indication of an eviction of a given cache block and an identifier for the given cache block without an associated indicator, search the plurality of directory ways concurrently.

7. The system of claim 1, wherein the indicator identifies a single one of the plurality of directory ways.

8. The system of claim 1, wherein the first coherent agent circuit is configured to store the indicator in a cache tag for the particular cache block.

9. A method comprising:
storing, by a particular one of a plurality of coherent agent circuits, a particular cache block in a respective cache circuit;
sending, by the particular coherent agent circuit to a coherence directory circuit, a fill notice including an indication of the particular cache block;
in response to determining that an entry associated with the particular cache block does not currently exist, creating, by the coherence directory circuit, a particular entry in a selected directory way of a plurality of directory ways;
sending, by the coherence directory circuit to the particular coherent agent circuit, an indicator identifying a subset of the plurality of directory ways that includes the particular entry; and
storing, by the particular coherent agent circuit, the indicator in a location associated with the particular cache block.

10. The method of claim 9, further comprising:
in response to evicting the particular cache block, sending, by the particular coherent agent circuit to the coherence directory circuit, an indication of the evicting including the indicator;
in response to the indication of the evicting, selecting, by the coherence directory circuit using the indicator, the subset of directory ways; and
searching, by the coherence directory circuit, for the particular entry in the selected subset of directory ways.

11. The method of claim 10, further comprising:
determining, using the particular entry, whether another coherent agent is currently caching a respective copy of the particular cache block; and
in response to determining that no other coherent agent is currently caching a respective copy of the particular cache block, invalidating the particular entry that is associated with the particular cache block.

12. The method of claim 10, further comprising:
determining, using the particular entry, whether another coherent agent is currently caching a respective copy of the particular cache block; and
in response to determining that at least one other coherent agent is currently caching a respective copy of the particular cache block, updating, by the coherence directory circuit, the particular entry to indicate that the particular coherent agent circuit no longer is caching the particular cache block.

13. The method of claim 9, further comprising:
receiving, by the particular coherent agent circuit, a directory marker disable signal;
storing, by the particular coherent agent circuit, a different cache block in the respective cache circuit;
in response to determining that an entry associated with the different cache block does not currently exist, creating, by the coherence directory circuit, a different entry in a different one of the plurality of directory ways;
sending, by the coherence directory circuit to the particular coherent agent circuit, a different indicator identifying a different subset of the plurality of directory ways that includes the different entry; and
ignoring, by the particular coherent agent circuit, the different indicator.

14. The method of claim 13, further comprising:
in response to evicting the different cache block, sending, by the particular coherent agent circuit to the coherence directory circuit, an indication of the evicting without the indicator;
in response to the indication of the evicting without the indicator, selecting, by the coherence directory circuit, the plurality of directory ways; and
searching, by the coherence directory circuit, for the particular entry in the plurality of directory ways.

15. An apparatus comprising:
a plurality of coherent agent circuits, wherein a given coherent agent circuit of the plurality of coherent agent circuits includes a respective cache circuit;

a coherence directory circuit including a plurality of directory ways for storing coherency information associated with the plurality of coherent agent circuits, wherein a particular one of the plurality of coherent agent circuits is configured to:

store a particular cache block by evicting a different cache block;

send, to the coherence directory circuit, an eviction notice with a first way indicator and an identifier for the different cache block; and send, to the coherence directory circuit, a fill notice with an identifier for the particular cache block;

wherein the coherence directory circuit is configured to:

create a particular entry, associated with the particular cache block, in a selected directory way of the plurality of directory ways;

send, to the particular coherent agent circuit, a second way indicator that indicates a first subset of the plurality of directory ways that hold the particular entry; and search a second subset of the plurality of directory ways indicated by the second way indicator.

16. The apparatus of claim 15, wherein the coherence directory circuit is further configured to:

in response to a determination that no other coherent agent is currently caching a respective copy of the different cache block, invalidate a different entry that is associated with the different cache block.

17. The apparatus of claim 15, wherein the coherence directory circuit is further configured to:

in response to a determination that at least one other coherent agent is currently caching a respective copy of the different cache block, update a different entry to indicate that the particular coherent agent circuit no longer is caching the different cache block.

18. The apparatus of claim 15, wherein the particular coherent agent circuit is a processor complex including a plurality of processor cores having respective individually-programmable directory marker enable bits; and wherein the plurality of processor cores are configured to:

store a given way indicator received from the coherence directory circuit if the respective directory marker enable bit is set; and ignore a different way indicator received from the coherence directory circuit if the respective directory marker enable bit is reset.

19. The apparatus of claim 15, wherein the particular coherent agent circuit is further configured to store the second way indicator in a cache tag associated with the particular cache block.

20. The apparatus of claim 15, wherein the particular coherent agent circuit is further configured to store the second way indicator in a way indicator table that is accessed using a cache tag for the particular cache block.

* * * * *